United States Patent [19]
Canter et al.

[11] Patent Number: 6,049,190
[45] Date of Patent: Apr. 11, 2000

[54] SPACECRAFT POWER SYSTEM

[75] Inventors: Stanley Canter, San Carlos; John C Hall, Saratoga, both of Calif.

[73] Assignee: Space Systems/Loral, Inc., Palo Alto, Calif.

[21] Appl. No.: 09/059,224

[22] Filed: Apr. 13, 1998

[51] Int. Cl.[7] .................................................. H01M 10/46
[52] U.S. Cl. .......................................... 320/101; 323/906
[58] Field of Search ........................... 323/906; 320/101, 320/102, 162, 163, 164

[56] References Cited

U.S. PATENT DOCUMENTS

| | | | |
|---|---|---|---|
| 4,731,870 | 3/1988 | Black et al. ............................. | 455/127 |
| 4,888,702 | 12/1989 | Gerken et al. .......................... | 364/494 |
| 5,153,497 | 10/1992 | Eiden ....................................... | 320/61 |
| 5,631,535 | 5/1997 | Van Der Merwe ........................ | 320/9 |
| 5,734,205 | 3/1998 | Okamura et al. ....................... | 307/110 |

*Primary Examiner*—Shawn Riley
*Attorney, Agent, or Firm*—Perman & Green, LLP

[57] ABSTRACT

A spacecraft power system having an increased number of battery cells that is charged to the battery's full capacity, which exceeds a predetermined maximum voltage allowed by a bus. The battery can be disconnected from the bus during charging. The battery is then partially discharged to accommodate the bus before being reconnected. This provides a reduced voltage range experienced by the bus, as the minimum battery voltage is increased by the increased number of cells. A tap is provided to supply the bus with power when the battery is disconnected from the bus, and when a solar array powering the bus fails to supply current to the bus.

17 Claims, 2 Drawing Sheets

SPACECRAFT POWER SYSTEM

FIELD OF THE INVENTION

This invention relates generally to battery technology and, in particular, to battery interconnection and battery charging methodology, using nickel-cadmium, nickel-hydrogen or lithium-ion batteries, for efficient, low mass spacecraft power systems.

BACKGROUND OF THE INVENTION

As a communication satellite moves around the earth, it passes through two phases in regard to charging and discharging of its on-board batteries. One phase is an eclipse phase, the other is a non-eclipse phase. In the eclipse phase, a solar array is not able to supply power to the spacecraft system and batteries are needed to supply the necessary power to the spacecraft. It is a challenge to keep the spacecraft sufficiently supplied with power by the batteries during the eclipse phase, as the output voltage of the batteries tends to decrease as the battery power or charge goes down.

It is known in the art that batteries used in spacecraft, specifically batteries used in a satellite, need to be light in weight and used most efficiently due to the launching cost and/or payload considerations. Different types of batteries have been developed to meet these needs. Batteries, such as nickel-cadmium, nickel-hydrogen or lithium-ion batteries, have been used. A typical satellite power system would include a set of batteries, a charge converter, and solar arrays all coupled to a common bus, with power being supplied alternatively by either the batteries or the solar arrays.

Spacecraft power system architectures most commonly comprise two types of systems, one using a direct energy transfer, fully regulated bus, and the other using a semi-regulated, direct energy transfer bus.

The direct energy transfer, fully regulated bus has the drawback of requiring a discharge regulator which is only utilized during a fraction of the spacecraft's operating life. Moreover, discharge regulators are expensive, heavy (which drives up launching cost), and they may include components interconnected in such a way that if some component(s) fail, the entire regulator will fail. Furthermore, discharge regulators consume some amount of spacecraft power, even during periods when they are not converting battery energy. In addition, the discharge converter must be operated at less than 100% efficiency, thereby effectively wasting battery energy.

The semi-regulated, direct energy transfer bus operates without a discharge regulator. While eliminating the drawbacks of the discharge regulator as listed above, the semi-regulated direct energy transfer bus has a drawback related to a non-optimum use of the solar array energy. The non-optimum use is caused by an effort to eliminate or avoid an undesired condition known as "solar array latch-up", which happens when the solar array output voltage becomes clamped to the battery. This typically occurs when the bus is changing from being powered by the battery to being powered by the solar array.

As the satellite emerges from eclipse, the solar array as well as battery begin to share the satellite load (both provide current at a battery voltage). This in effect reduces the battery current which in turn allows the battery voltage to rise. By example, with a negative impedance constant power satellite load, the rising battery voltage further reduces current demand. If the solar array is sufficiently large, its current will completely supplant the battery current, i.e., the battery ceases to discharge. Excess solar array current may now be used to charge the battery and the bus is deemed to be unlatched from the battery.

If insufficient array current is available, the battery will never fully return to open circuit. The solar array current becomes clamped by the battery voltage which continues to decrease as the battery is discharged, and a latch-up condition occurs. Without intervention, latch-up may lead to the loss of all satellite power.

In the prior art, the latch-up condition is avoided with an unregulated bus by over sizing the solar array such that the product of the array current and the open circuit satellite voltage at its maximum depth of discharge (end of eclipse) is greater than the end of eclipse bus power requirement. This approach, however, requires sizing the solar array for the end of eclipse power which is dictated by the battery voltage. This voltage is typically 65% of an equilibrium bus voltage. Thus, the array may be as much as 35% oversized with respect to its other operational requirements.

Typically, in a geosynchronous satellite power system, there are at least two sources of power. Referring to FIG. 3, a solar array 3 converts radiant energy into electrical energy for use by the satellite, and a battery 2 powers the satellite when the solar array 3 does not generate enough power to satisfy the requirements of the satellite. The prior art conventionally uses just enough battery cells such that when the battery 2 are fully charged, it does not exceed the maximum voltage allowed by a power bus 1. (see FIG. 3) Since the battery 2 is directly connected to the bus 1, and an unduly high voltage from the battery 2 is undesirable, the choice of the number of batteries is limited by a maximum voltage allowed by the power bus 1.

For example, if nickel-hydrogen(NiH) cell batteries are used in a space craft power supply system, the maximum number of $Ni-H_2$ cells used may be about 60 cells for a nominal 100 volt voltage level. Nickel-hydrogen batteries can be operated at a maximum of 1.65 volt per cell(at the end of battery charge), and a minimum of 1 volt per cell (at the end of a worst case discharge). Thus, the maximum voltage would be 60×1.65 volt/cell=99 volts, and the minimum voltage would be 60 volts. In a typical unregulated high voltage bus system, this will result in a bus variation(or range) of 60–99 volts, or 39 volts. This wide operating range can result in solar array latch-up at the end of the eclipse period, and also tends to reduce the efficiency of the power converters during periods of battery operation.

OBJECTS AND ADVANTAGES OF THE INVENTION

It is a first object and advantage of this invention to provide a spacecraft power system which does not employ battery discharge regulators.

It is a second object and advantage of this invention to provide a spacecraft power system which, while not employing battery discharge regulators, eliminates the possibility of solar array latch-up without requiring over design of the solar array.

It is a third object and advantage of this invention to provide a spacecraft power system in which a battery system can be charged to a voltage value that is 10–15% greater than prior art power systems.

It is a fourth object and advantage of this invention to supply emergency power to a spacecraft power system when a solar array is not able to provide sufficient power during a time that the battery is disconnected.

It is a fifth object and advantage of this invention to improve power converter efficiency when the converter is powered by a battery.

SUMMARY OF THE INVENTION

The foregoing and other problems are overcome and the objects of the invention are realized by methods and apparatus in accordance with the embodiments of this invention, wherein a battery cell count is increased between ten to fifteen per cent; and the additional voltage caused by the increase is reduced to an acceptable level by a means which reduces the voltage level of the battery.

An emergency tap is established to provide emergency power to the power bus if an unforeseen event occurs while the battery is decoupled from the power bus. This happens when the battery is being charged to a level above the maximum allowed voltage of the power bus and the relays are open.

Relatedly, the invention teaches a method for supplying emergency power via the tap. The tap is coupled to the battery with a voltage not exceeding the maximum allowed voltage of the power bus. Thus, the tap serves the purpose of supplying emergency power to the power bus by coupling a set of batteries to the bus when the solar array is not able to supply power to the power bus, while the battery is disconnected from the bus for charging.

Additionally, this invention teaches a method which reduces the bus voltage range. The bus voltage range is the difference between the maximum voltage of the bus and the minimum-voltage of the bus. With the 10–15% increase in battery count, the minimum voltage is increased correspondingly. In conjunction with the fact that the bus maximum voltage stays constant, the result is that the bus voltage range is reduced.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Reference is made to FIGS. 1, 2, 4, and 5 for illustrating a battery interconnection and battery charging methodology, such as but not limited to a spacecraft power system or satellite power system, that is suitable for practicing this invention.

Figure 1:
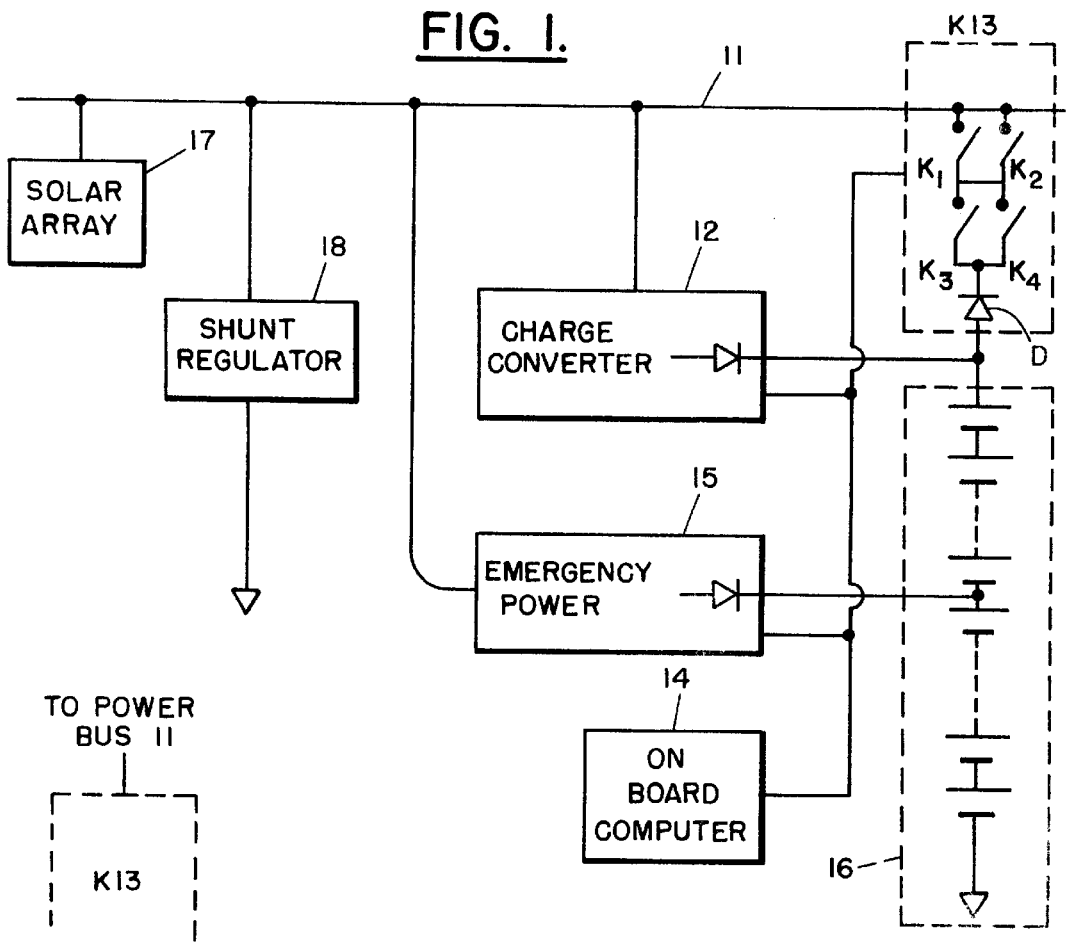
FIG. 1 is a block diagram of an embodiment of a spacecraft power system in accordance with this invention.
Figure 2:
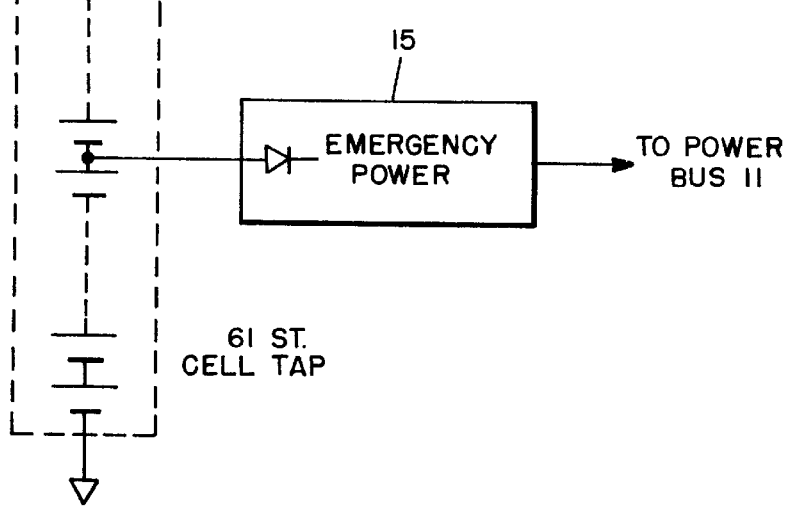
FIG. 2 is a diagram of the embodiment in FIG. 1 using nickel-hydrogen batteries.
Figure 3:
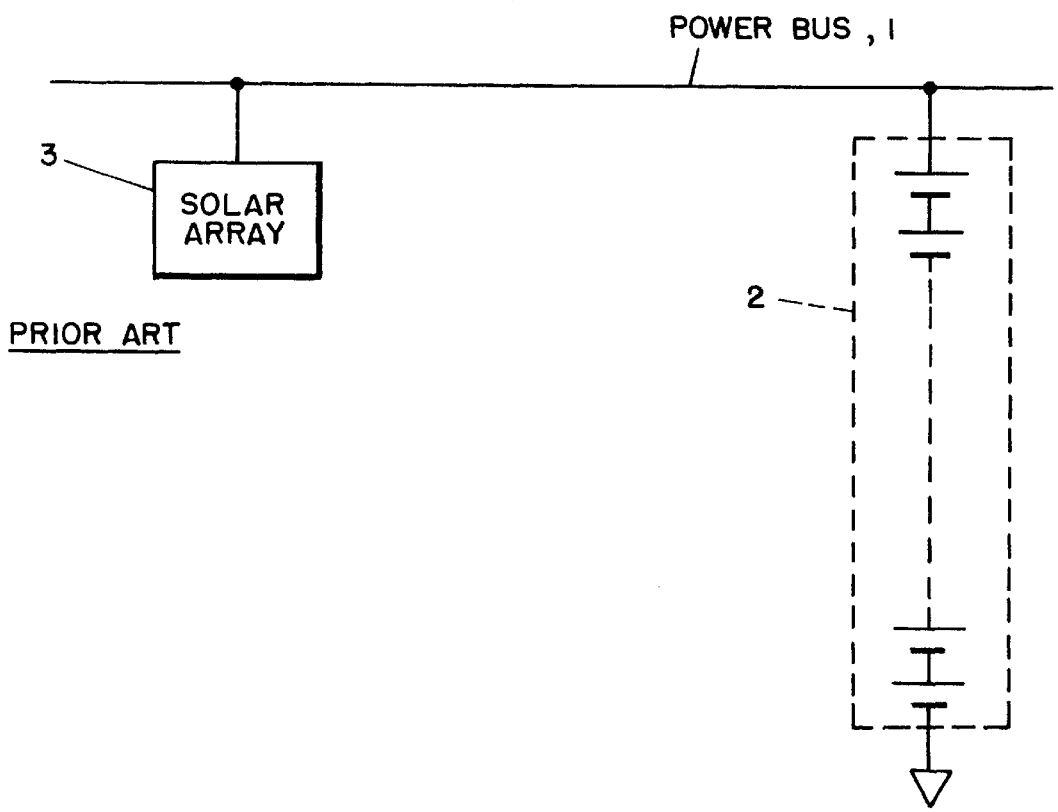
FIG. 3 is a diagram of a prior art spacecraft power system.

FIG. 1 illustrates a block diagram of an embodiment of a spacecraft power supply system in accordance with this invention. Power on a power bus 11 is supplied either by a solar array 17 or by a battery 16, with a voltage range from a predetermined minimum voltage limit to a predetermined maximum voltage limit. In special situations, the bus 11 may be powered by an emergency power unit 15. The emergency power unit includes a tap(as shown in FIG. 2) coupled to the batteries 16 for supplying a suitable voltage to the power bus 11. The suitable voltage preferably does not exceed the predetermined bus 11 voltage. Preferably the voltage would stay close to, but below the predetermined maximum bus 11 voltage. This occurs when a relay switch K 13 disconnects the battery 16 from the power bus 11 during a battery charging phase when the battery 16 is to be charged to a voltage above the predetermined maximum voltage limit of the power bus 11, and when the power bus 11 is intended to be powered by the solar array 17. If for some reason an interruption in solar array 17 power occurs the tap of the emergency power unit 15 automatically supplies power to the power bus 11. A charge converter 12 is coupled between the power bus 11 and one end of the battery 16. An on-board computer 14 controls the operation of the relay switch K 13, the charge converter 12, and the emergency power unit 15.

FIG. 2 is a diagram of an embodiment of FIG. 1 using nickel-hydrogen batteries tapped at a $61^{st}$ cell. The emergency power unit 15 is coupled at one end to the power bus 11, and at the other end to the tap of the battery 16. The tap is located such that the maximum voltage at the tap is less than or equal to the bus 11 voltage. A second node of the battery 16 is coupled to the relay switch K 13 which, in turn, is coupled to the power bus 11. A third node of the battery 16 is connected to ground.

By example, a Ni-$H_2$ battery may have a maximum, fully charged voltage of 1.65 volts/cell and a minimum voltage, at the end of discharge, of 1 volt/cell. The predetermined maximum voltage limit of the power bus 11 may be 101 volts. When the battery 16 is fully charged, each Ni-H battery may have the maximum charged voltage of 1.65 volts/cell. Thus, 61 series connected Ni-H cells will have a combined maximum voltage of 100.65 volts. (61×1.65 volts/cell=100.65 volts) It 101 volts is the maximum limit on the power bus 11, the point between the 61st and 62nd cell is an appropriate point of connection for the tap to be coupled to the power bus 11.

It is noted that the appropriate point of connection is dependent upon the voltage range of the battery 16 cells and the maximum voltage allowed by the power bus 11. The $61^{st}$ cell tap is used when the relay switch K 13 is open, or when the battery 16 is not electrically coupled to the power bus. This is during a time when the power bus 11 is supplied by the solar array 17, and the battery 16 is decoupled from the power bus for recharging via charge converter 12. It is noted here that during the non-eclipse phase the relay switch may be kept closed the whole time. And the battery 16 is only charged to a level within the predetermined maximum value of the bus 11. This may be controlled by the on-board computer 14. Furthermore, since the total battery cell count can be, for example, 10–15% greater in this invention than in the prior art, the $61^{st}$ cell tap is used to power the bus, when needed, at a suitable voltage level. A larger number of cells can overcharge the power bus 11, while a lower number will not provide an optimum amount of energy. Thus, the voltage of the tap is derived from the battery 16 in such a way that the tap voltage, i.e. the voltage of the emergency power unit 15 is less than the predetermined maximum voltage allowed for the bus. Since the batteries 16 are disconnected from the bus 11, the battery 16 can be charged to its full capacity which exceeds the maximum allowed voltage allowed by the power bus 11. The charging profile or method is described in FIG. 4 and FIG. 5 below.

Figure 4:
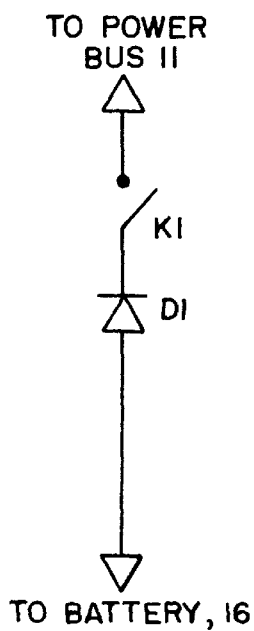
FIG. 4 depicts an embodiment of a switching system in accordance with this invention.

FIG. 4 depicts an embodiment of a switching mechanism in accordance with this invention. A relay $K_1$, which is a part of the relay switch K 13, has a diode $D_1$ placed in series with a contact of the relay ($K_1$) The relay $K_1$ only operates during the time that the diode $D_1$ is reverse biased, which is when the power bus 11 voltage exceeds the battery 16 voltage. Thus, during eclipse, the power bus 11 is powered by the battery 16 through the forward biased diode $D_1$ until the solar array 17 produces sufficient power to raise the power bus 11 voltage above the battery 16 voltage, thereby reverse biasing the diode $D_1$. This generally occurs when the solar array 17, illuminated by the sun, is supplying electric current to the power bus.

It is noted here that the relay switch K 13 may include one diode $D_1$ and one relay $K_1$ or a plurality of diodes and relays to provide redundant operation.

It is further noted that the relay(s) may only be used (i.e. opened) during a period when there is a need to charge the battery 16 to its full capacity. This generally occurs during equinox seasons which occur during about 44 days in two separate annual period. During the rest of the year, the relay K13 is closed and the battery 16 is diode coupled to the power bus 11.

Figure 5:
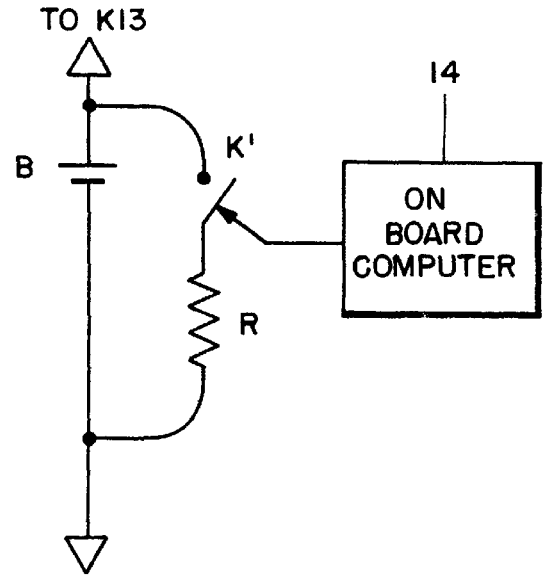
FIG. 5 depicts an embodiment of a circuit for burning off excessive battery voltage.

FIG. 5 depicts an embodiment of a reconditioning load which burns off excessive battery voltage. A resistor R is switchably coupled to a battery B. The coupling and decoupling are accomplished with a switch K', which is itself controlled by the on-board computer 14. Since the battery 16 count made possible by this invention can be 10–15% more than the prior art, the battery 16 voltage when fully charged may exceed the maximum voltage allowed by the power bus 11. Hence, a burning off process utilizing the reconditioning load R reduces the battery 16 voltage to a suitable voltage before connecting same to the power bus 11.

A method in accordance with this invention includes determining whether the bus 11 voltage is higher than the battery 16 voltage. If the battery 16 voltage is higher than the power bus 11 voltage, the on-board computer 14 directs the disconnection of the battery 16 from the power bus 11, which is achieved via the set of relays $K_1$–$K_4$ redundantly coupled between the bus and the battery. Once the battery 16 is disconnected from the power bus 11, the battery 16 can be charged to a level higher than the maximum voltage tolerated by the power bus 11.

Another method in accordance with this invention includes supplying the emergency power to the power bus 11 when the power bus 11 should be powered by the solar array 17. A tap for utilizing part of the battery 16 power is electrically coupled to the power bus 11. The tap is connected to the bus 11 through a diode. The diode only allows current to pass from the tap to the bus 11 when the tap voltage is greater than the bus 11 voltage. This can only occur if: (a) relay switch K 13 is open (during the battery 16 charging period), and (b) the solar array 17 power falls below bus 11 requirements. Thus, the tap only provides power during an emergency, non-normal operating condition, and emergency power is always available. The maximum voltage of the tap is limited by factors including the maximum charged voltage per cell and the predetermined maximum voltage of the power bus 11.

According to the instant invention, the problems discussed above that plague prior art power systems are overcome since one may add additional cells (e.g., from 60 cells to 72 cells). Thus, the minimum bus voltage may be increased to 72 volts from 60 volts, assuming 1 volt/cell minimum. However, the maximum voltage, when fully charged, would be 118 volts. Since 100 volts, in an exemplary embodiment, is the maximum voltage allowed by the power bus 11, the batteries 16 are first disconnected from the power bus 11, are then fully charged, and then the excess battery charge is reduced from 118 volts down to 100 volts before reconnecting the battery 16 back to the bus. This is done by the process of burning off the excessive power (see FIG. 5). In the preferred embodiment, excess power is removed by placing the resistors (R) across the battery 16 and controlling the process by an autonomous charge management program residing within the on-board computer 14. The burning off process only eliminates about 0.5–1.0 per cent of the total stored energy, while reducing the voltage to about 100 volts. The result is a beneficial narrower range of voltage variation, i.e. 72–100 volts or 28 volts, which reduces the possibility of solar array latch-up at the end of eclipse period, and also increases the efficiency of the power converters during all phases of the orbit.

In general, a power system may have a predetermined (designed) maximum power bus 11 voltage value of X; a set of battery cells series connected having a maximum voltage of Y, where X<Y; a suitably predetermined number m, where a tap is originated from the n-mth cell to power the bus 11 under certain circumstances, such as the situation where K 13 is open when the solar array 17 is unable to power the bus 11. The voltage value at the n-mth cell is $Y_{n-m}$, which is less than or equal to X because of the selection of the number m. Additionally, the power system may have a variable $V_B$ representing voltage value of the whole set of batteries 16. The range of $V_B$ is between a minimum voltage which is the cumulative value of the series connected cells of the battery, at their worst case of discharge, and Y. Since it is undesirable to connect the battery 16 to the power bus 11 when $V_B > X$, $V_B$ is reduced to a level such that $V_B \leq X$. This can be done in the preferred embodiment by placing the resistor R across the Battery B during a time period after recharging but prior to connecting the battery 16 to the bus 11.

It is noted that the on-board computer 14 may determine a suitable charge profile based on the discharge condition of the battery 16 experienced during the last eclipse cycle. Providing the suitable charge profile includes the operation of the relays K 13 and the control of the reconditioning loads(R).

In the preferred embodiment of the instant invention, K 13 is comprised of relays $K_1$–$K_4$ connected in series with diodes and closed only when the diodes are reverse biased. The number of relays shown in FIG. 1 is not limited to only four relays $K_1$–$K_4$. Four relays are shown in FIG. 1 in order to provide redundancy in the event of either a short or an open failure of any given relay. The relays are preferably operated individually.

It is further noted here that the instant invention is also applicable on a fully regulated nor-isolated system. The benefit of which is the increased number of cells that could be used as compared to the prior art. Thus extending the power range of the system. In addition, with a regulated system, the instant invention reduces the battery 16 voltage range, thereby improving converter efficiency.

While the invention has been particularly shown and described with respect to preferred embodiments thereof, it will be understood by those skilled in the art that changes in form and details may be made therein without departing from the scope and spirit of the invention.

What is claimed is:

1. A spacecraft power system comprising:
   a power bus having a first node coupled to a set of batteries supplying power to said power bus, and having a second node coupled to a solar array alternatively supplying power to said power bus;

switching means for disconnecting the set of batteries from said power bus allowing said set of batteries to be charged to a fully charged voltage that exceeds a maximum voltage value allowed by said power bus; and means for reducing said fully charged voltage to a voltage acceptable by said power bus before reconnecting said set of batteries to said power source.

2. A spacecraft power system as set forth in claim 1, wherein said means for reducing said fully charged voltage bus comprises at least ore resistor switchably connected across said set of batteries.

3. A spacecraft power system as set forth in claim 1, wherein said switching means comprises at least one relay connected in series between said set of batteries and said power bus.

4. A spacecraft power system as set forth in claim 3, wherein said switching means further comprises at least one diode connected in series with said relay.

5. A method for charging a spacecraft power system to a voltage level above a predetermined maximum voltage allowed by a power bus comprising the steps of:

determining at least one condition for disconnecting the power bus from a battery;

disconnecting the battery from the power bus;

charging the battery to a full capacity having a voltage that exceeds the predetermined maximum voltage allowed by the power bus;

partially discharging -he battery thereby reducing the battery voltage to a level allowed by the power bus;

determining at least one condition for reconnecting the battery to the power bus; and reconnecting the battery to the power bus.

6. A spacecraft power system comprising:

a power bus having a first node coupled to a set of batteries supplying power to said power bus, and having a second node coupled to a solar array alternatively supplying power to said power bus;

switching means for coupling and decoupling said set of batteries to said power bus; and an emergency power supply, said emergency power supply comprising:

a tap coupled to said set of batteries in such a way that said tap's voltage stays within a predetermined range utilizing part of the power derived from said set of batteries supplying power to said power bus when needed; and a diode which only allows current to pass through said tap to said bus when said solar array power is less than required by said bus.

7. A spacecraft power system as set forth in claim 6, wherein said set of batteries can be charged to a voltage value exceeding a predetermined maximum voltage allowed by the power bus, and wherein said tap is positioned so as not to exceed the predetermined maximum voltage.

8. A spacecraft power system as set forth in claim 7, wherein said emergency power supply supplies said power bus with power when the solar array is not able to supply said power bus with power.

9. A spacecraft power system comprising a power bus having a predetermined maximum bus voltage value X, said power bus having a first node coupled to a battery with a predetermined number n of series connected cells, having a maximum voltage value Y, where Y>X, and a second node coupled to a solar array, said power system comprising:

a battery tap located at n-m cells and having a voltage $V_{n-m}$, where $V_{n-m} \leq X$; and at least one diode for selectively coupling and decoupling said tap from said bus.

10. A spacecraft power system as set forth in claim 9, wherein said tap supplies said power bus with power when said set of batteries is disconnected from said power bus and when said solar array is not able to supply said power bus with sufficient power.

11. A spacecraft power system comprising a power bus with a first node coupled to a set of batteries supplying power to said power bus, and a second node coupled to a solar array alternatively supplying power to said power bus, wherein there is a predetermined power bus voltage X, a value Y denotes a maximum voltage of said set of batteries supplying power to said power bus, where Y>X, a variable $V_B$ denotes the voltage value of said set of batteries supplying power to said power bus, where $V_B \leq Y$, said power system further comprising switching means for disconnecting said set of batteries from said power bus allowing said set of batteries to be charged to Y, and reconnecting said set of batteries to said power bus when $V_B \leq X$; means for reducing $V_B$ from $X<V_B \leq Y$ to $V_B \leq X$; and control means for coordinating said switching means and said means for reducing $V_B$.

12. A spacecraft power system as set forth in claim 11, wherein said switching means is comprised of at least one relay.

13. A spacecraft power system as set forth in claim 12, wherein said switching means is comprised of at least one diode connected in series with said relay.

14. A spacecraft power system as set forth in claim 11, wherein said control means is comprised of an on-board computer.

15. A spacecraft power system as set forth in claim 11, wherein said means for reducing $V_B$ is comprised of at least one resistor switchably (connected across said batteries by said control means.

16. A method for charging a spacecraft power system to a voltage level above a predetermined maximum voltage allowed by a power bus, comprising the steps of:

in response to determining at least one condition for disconnecting the power bus from a battery, disconnecting the power bus from the battery;

charging the battery to a full capacity having a voltage that exceeds the predetermined maximum voltage allowed by the power bus;

partially discharging the battery thereby reducing the battery voltage to a level allowed by the power bus;

determining at least one condition for reconnecting the battery to the power bus; and reconnecting the battery to the power bus.

17. A method for applying emergency power to a spacecraft power bus, comprising steps of:

providing a tap coupled to a set of batteries in such a way that a voltage of said tap stays within a predetermined voltage range; and in response to a condition wherein the set of batteries is disconnected from said power bus and wherein an electric current supplying said power bus is below a predetermined level, supplying emergency power to the poser bus through the tap.

* * * * *